May 22, 1962     B. H. VESTER, JR     3,036,293

PULSE INTEGRATION APPARATUS

Filed Nov. 22, 1957

WITNESSES:

INVENTOR
Benjamin H. Vester, Jr.
BY Maury I. Hull
ATTORNEY

United States Patent Office 3,036,293
Patented May 22, 1962

3,036,293
PULSE INTEGRATION APPARATUS
Benjamin H. Vester, Jr., Catonsville, Md., assignor to Westinghouse Electric Corporation, East Pittsburgh, Pa., a corporation of Pennsylvania
Filed Nov. 22, 1957, Ser. No. 698,189
6 Claims. (Cl. 340—174)

This invention relates to pulse integration apparatus, and more particularly to such apparatus especially suitable for integrating video or echo pulses or signals to improve the signal-to-noise ratio in pulse radar apparatus.

The apparatus embodying the instant invention includes a delay line having the video echo pulses applied thereto. A plurality of square hysteresis loop reactors each having a winding and core individual thereto are connected at different spaced points or taps along the delay line, and each of the windings has connected in series therewith a transistor switch adapted while a signal is applied to one of the elements thereof to close the circuit through the winding. The reactors integrate signals or pulses applied to the delay line and thereafter, upon the application of an appropriate control or "read-out" signal, feed the integrated pulse signals back into the delay line and thence to display or other apparatus for using the pulses.

Accordingly, a primary object of the invention is to provide new and improved pulse integration apparatus.

Another object is to provide new and improved pulse integration apparatus employing a delay line and a plurality of square hysteresis loop reactors for integrating pulses traveling along the delay line.

A further object is to provide new and improved pulse integration apparatus especially suitable for use in pulse radar apparatus.

Figure 1:
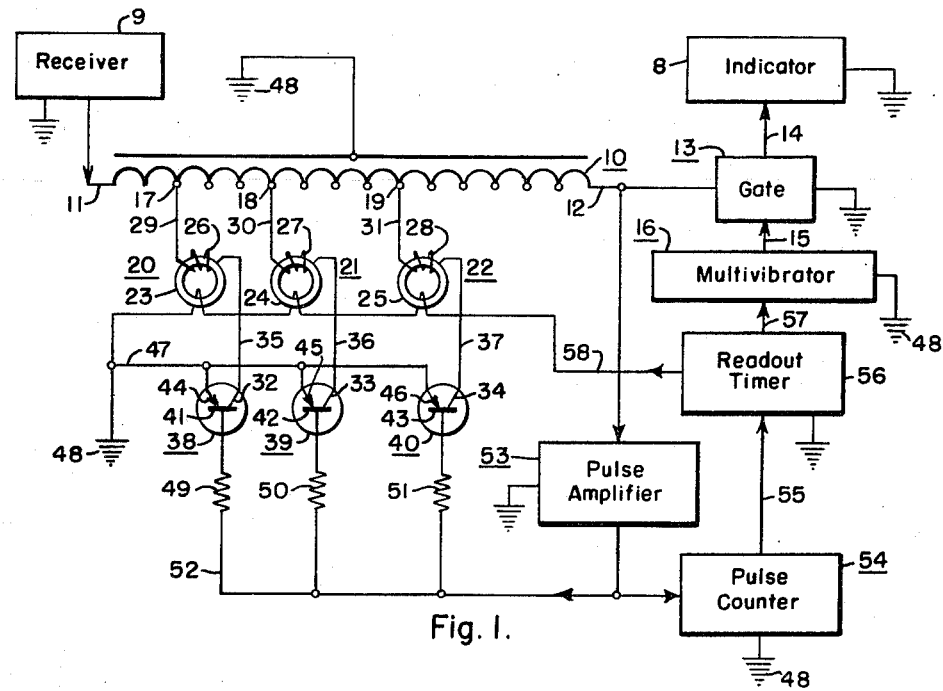
Figures 2A, 2B, 2C:
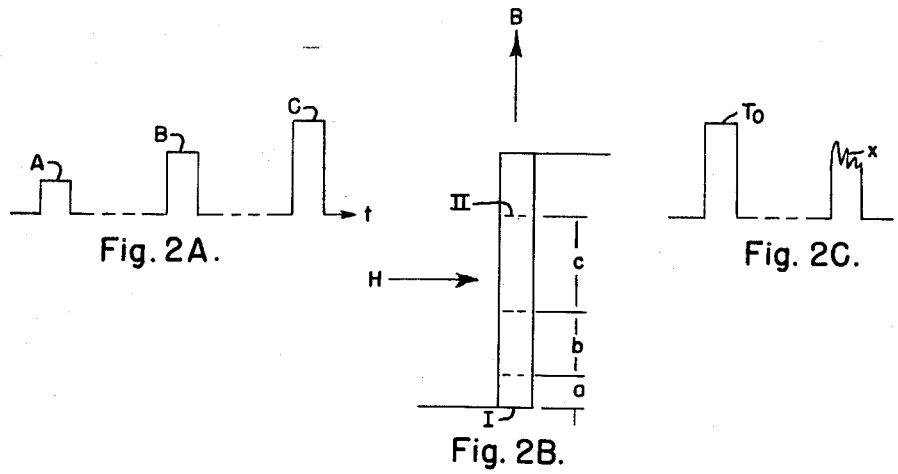

Other objects and advantages will become apparent after a study of the following specification when read in connection with the accompanying drawings, in which:

FIGURE 1 is an electrical circuit diagram of the preferred embodiment of the invention; and FIGS. 2A, 2B and 2C are graphs illustrating the operation of the apparatus of FIG. 1.

Particular reference should be made now to FIG. 1 for a more detailed understanding of the invention. A delay line, generally designated 10, has an input lead 11 to which are applied echo signals or video pulses "$x$" to be integrated, FIG. 2C, which may be obtained from a radar receiver 9 of any convenient design shown in block form. A portion of the energy in the transmitted pulse $T_0$, FIG. 2C, is also applied to lead 11. The delay line 10 may be of any desired or convenient length, for example, 25 microseconds to 100 microseconds. The output lead 12 from the delay line is connected to a gate circuit which may be of conventional design and is shown in block form at 13, the output of the gate circuit being delivered to lead 14 and indicator or other utilization apparatus 8, the passage of pulses or signals through the gate circuit being controlled by gate pulses supplied by lead 15 from a multivibrator 16, in a manner to be hereinafter more fully described.

A plurality of taps are provided on the delay line 10 in a conventional manner, three of these being shown at 17, 18 and 19, but it should be understood that any desired number of taps may be provided. There are provided three miniature toroids, generally designated 20, 21 and 22, having cores 23, 24 and 25, respectively, and windings 26, 27 and 28, respectively. One end of each of the windings 26, 27 and 28 is connected by way of leads 29, 30 and 31, respectively, to the aforementioned taps 17, 18 and 19, respectively. The other ends of the windings 26, 27 and 28 are connected by leads 35, 36 and 37, respectively, to the collectors 32, 33 and 34, respectively, of three triode transistors generally designated 38, 39 and 40, respectively. The transistors 38, 39 and 40 have bases 41, 42 and 43, respectively, and emitters 44, 45 and 46, respectively, which are provided for purposes hereinafter to be made apparent. All of the emitters 44, 45 and 46 are connected together by lead 47 and thence to ground 48. The aforementioned bases 41, 42 and 43 are connected by way of resistors 49, 50 and 51, respectively, to a lead 52, for purposes to be made hereinafter more clearly apparent.

The aforementioned output from the delay line 10 applied to lead 12, is thence applied to a pulse amplifier of any convenient design, shown in block form and generally designated 53, the output of the pulse amplifier 53 being applied to the aforementioned lead 52 and also to a pulse counter of any convenient design shown in block form and generally designated 54. The output of the pulse counter 54 is applied by lead 55 to a read-out timer and read-out signal generator shown in block form and generally designated 56. The read-out timer 56 is constructed and arranged to apply on lead 58 a large pulse of current, this reset wire 58 being preferably threaded once through each of the cores 23, 24 and 25, that is, there is one turn on each of the windings, the circuit for the read-out pulse being completed by way of lead 47 to ground 48.

The read-out timer 56 is also constructed and arranged to apply by way of lead 57 a trigger pulse to a multivibrator heretofore mentioned and designated 16.

In the operation of the aforedescribed apparatus and circuit of FIG. 1 in, for example, a conventional pulse radar set, the normal range sweep techniques would be used in the radar apparatus, for example, for the first 100 microseconds, or to any other value corresponding to the limit of the normal detection range of the radar for non-integrated signals, and the integration circuit herein shown and described would, for example, be used for ranges beyond this normal detection range, any suitable means, not shown, being provided for switching or changing between the two modes of operation.

As aforementioned, the apparatus of the instant invention utilizes the integrating propertives of a magnetic core. The aforemetioned cores 23, 24 and 25 are composed of "square loop" material, and the toroids, generally designated 20, 21 and 22, integrate corresponding portions of successive pulses in a manner illustrated by FIGS. 2A and 2B. In FIG. 2A there are shown three pulses or pulse portions designated A, B and C, and in FIG. 2B there is shown a typical square B—H curve, the area designated "$a$" indicating the integral of pulse A, the area designated "$b$" indicating the integral of pulse B and the area designated "$c$" indicating the integral of pulse C, the region designated II representing the stored integral of all three pulses, and I representing the point or area of negative saturation.

It should be understood that pulses A, B and C represent corresponding portions of three successive radar echo or return signals or range sweeps, the pulses being of different amplitudes because of variations in the echo pulses which may result from a number of causes, as indicated by the single echo pulse "$x$" of FIG. 2C, which, while it may have substantially the same width as the transmitted pulse $T_0$, contains marked irregularities in amplitude over its duration. Successive echo returns or range sweeps might provide additional irregularities.

A well known formula for setting forth this integrating process is the expression $$\Delta\phi\Big]_{t_1}^{t_2} = -\frac{1}{N}\int_{t_1}^{t_2} e\, dt$$

where $\Delta\phi$ is the change in flux in the core between $t_1$ and $t_2$, N is the number of turns, and $\int_{t_1}^{t_2} edt$ is the total volts seconds stored between $t_1$ and $t_2$.

This integration and storage property of the aforementioned cores is used to store the video information as aforementioned. It is further well known that where square or rectangular hysteresis loop material is employed in the core, pulses will be integrated in the manner of FIG. 2B. Let is be assumed by way of explanation that FIG. 2B represents the integration of pulses in toroid 20. When a reverse current is forced through the one turn read-out winding associated with the core 23 of toroid 20 shown in FIG. 1, the core condition will change from the region designated II or the stored integral of all the pulses shown in FIG. 2B, to the region designated I in FIG. 2B and in the process, substantially as many volt-seconds will be returned to the circuit as were initially stored therein. That is, the integrated value of the three pulses is "read out" by forcing the core 23 back to negative saturation.

Particular reference should be made now to FIG. 1. Assume for purposes of description, that a pulse $T_0$ as illustrated in FIG. 2C is traveling down the delay line 10, having been applied thereto on lead 11. When the pulse $T_0$ reaches the end of the delay line 10, it is supplied by way of lead 12 to the aforementioned pulse amplifier 53 where it is amplified and used as a trigger to switch all of the transistor gates 38, 39 and 40 on, for example, 1 microsecond, or whatever width the transmitted pulse $T_0$ may have. Assume for the purpose of ease of explanation that only one echo return "$x$" occurs during each range sweep. Further, assume for purposes of explanation that the time delay between taps 17 and 19 is less than the time duration of "$x$," and that during each range sweep echo return "$x$" is distributed along the delay line between taps 17 and 19. The total video information represented by the echo signal or pulse "$x$" of FIG. 2C, at this time as aforementioned is distributed along the delay line 10, and for 1 microsecond, the small magnetic cores 23, 24 and 25 integrate the voltages appearing at the associated taps 17, 18 and 19, respectively, to which their respective windings are connected. This sequence would be repeated for the desired number of radar sweeps, a particular core in each case having a total flux change proportional to the integrated value of the voltage appearing at a particular range, in a 1 microsecond segment of the range. After the desired number of sweeps, in accordance with the transmitted pulse repetition rate, have been integrated, as determined by the aforementioned pulse counter 54 (which may, if desired, be a diode R-C pulse counter of conventional design which counts each of the aforementioned transmitted pulses $T_0$), all of the cores 23, 24 and 25 would be returned to negative saturation by putting a large read-out pulse of current through the one turn read-out windings connected in series to the aforementioned reset wire 58, this read-out pulse being generated in and applied from the aforementioned read-out timer 56. At the same time the transistor switches 38, 39 and 40 would be keyed on by the pulse from amplifier 53, and each core would return to the aforementioned delay line 10 a pulse whose volt-second integral would be equal to the integrated volt-seconds from the former repetition rate periods. All of these "read-out" signals applied to the delay line 10 will then travel down the delay line and will reach the output end of the delay line and lead 12 with the proper time sequence of relation to be used directly as video pulses. Thus, the same delay line which was used to distribute the video information to the magnetic storage devices 20, 21 and 22, is also used to gather the integrated information from the storage devices or storage toroids.

At the same time that the read-out timer 56 applies a pulse on the aforementioned lead 58, it may, or soon thereafter may, apply on the aforementioned lead 57 a pulse or trigger for the aforementioned multivibrator 16 which is constructed and arranged to thereupon or soon thereafter apply on lead 15 a gate pulse which is utilized by the aforementioned gate apparatus shown in block form and designated 13 to pass the integrated outputs from the delay line 10 to lead 14 for use by the radar indicator apparatus 8 or other utilization device connected thereto. Preferably, the gate at 13 has a duration at least as great as the length of the time delay of the read-out operation of the delay line, that is, the time required for the energy delivered back to the line at the first tap 17 to reach output lead 12.

In order to get a minimum loading effect on the delay line, preferably the windings with their cores are of considerably higher impedance than the delay line. It should be noted that during the read-out operation, the impedance of the delay line can be fairly low and can be driven hard with the read-out signal since during this period or interval the toroids are each operating as a closely coupled transformer and it is necessary only to keep the primary impedance, that is, the read-out signal impedance, at low value to accomplish the desired objective.

In summary, the delay line and associated integrators look at the same bits of radar echo information several times, the number being determined by the sweeps counted at 54, adds or integrates the bits or information in proper time sequence and delivers the results as video pulses of substantially larger amplitude.

It should be understood that, for ease of illustration, the pulses or signals $T_0$ and "$x$" of FIG. 2C are shown to be spaced by an interval not much greater than their durations, while in actual practice the time interval between the occurrence of $T_0$ and the occurrence of "$x$" will usually be many times that shown.

The term "video signal" as employed in the claims appended hereto is defined as any signal to be integrated applied to the delay line 10.

Whereas the invention has been shown and described with respect to an embodiment thereof which gives satisfactory results, it should be understood that changes may be made and equivalents substituted without departing from the spirit and scope of the invention.

I claim as my invention:

1. In pulse integration apparatus, in combination, a delay line, integrating means connected to the delay line at a point other than the output end of the delay line, said delay line being adapted to have a repetitive control pulse and a repetitive signal of the same repetition rate applied thereto sequentially, each pulse being followed by a signal before the next pulse occurs, control means operatively connected to the delay line and integrating means and responsive to the control pulses for causing said integrating means to integrate portions of the signal appearing at said point during each repetition of said signal, counting means operatively connected to the control means for counting the control pulses, read-out signal generating means operatively connected to the counting means for generating a read-out signal when a preselected number of control pulses have occurred, and means operatively connected to the integrating means and to the read-out signal generating means and having the read-out signal applied thereto for utilizing the read-out signal to return the energy in the integrating means to the delay line.

2. In pulse integration apparatus, in combination, a delay line, integrating means connected to the delay line at a point other than the output end of the delay line, said delay line being adapted to have a repetitive control pulse and a repetitive video signal of the same repetition rate applied thereto sequentially, each pulse being followed by a signal before the next pulse occurs, control means operatively connected to the delay line and integrating means and responsive to the control pulses for causing said integrating means to integrate portions of the video signal appearing at said point during each repetition of said video signal, counting means operatively connected to the control means for counting the control pulses, read-out signal generating means operatively connected to the counting means for generating a read-out signal when a preselected number of control pulses have occurred, means operatively connected to the integrating means and to the read-out signal generating means and having the read-out signal applied thereto for utilizing the read-out signal to return the energy in the integrating means to the delay line, and gate means operatively connected to the output end of the delay line and to the read-out signal generating means, said gate means being adapted to have a gate signal applied thereto from the read-out signal generating means substantially coincident with the generation of the read-out signal and having a duration at least as great as the time required for a pulse to travel from said point to said output end.

3. In pulse integration apparatus, in combination, a delay line having a plurality of taps and adapted to have a repetitive control pulse and a repetitive signal of the same repetition rate applied thereto sequentially, each pulse being followed by a signal before the next pulse occurs, a plurality of magnetic core integrating means connected to said plurality of taps respectively, control means operatively connected to the delay line and plurality of integrating means and responsive to the control pulses for causing said plurality of integrating means to integrate portions of the signal appearing at said plurality of taps respectively during each repetition of said signal, and means operatively connected to the output end of the delay line and to said control means and to said plurality of integrating means for providing for the return of integrated energy to the delay line and for the passage of the integrated energy from the output end of the delay line.

4. In pulse integration apparatus, in combination, a delay line having a plurality of taps and adapted to have a repetitive control pulse and a repetitive video signal of the same repetition rate applied thereto sequentially, each pulse being followed by a signal before the next pulse occurs, a plurality of magnetic core integrating means connected to said plurality of taps respectively, a plurality of switching means connected in series in circuits with said plurality of magnetic core integrating means respectively and adapted while the switching means are in preselected settings to close the circuits through the plurality of integrating means and provide for the integration of portions of the video signal appearing at the respective taps during each repetition of said video signal, control means operatively connected to the delay line and plurality of integrating means and responsive to the control pulses for causing said plurality of switches to assume said predetermined settings, and output means operatively connected to the delay line, to the control means, and to the plurality of integrating means for providing for the return of integrated energy to the delay line at a predetermined time and the passage thereof from the delay line.

5. In pulse integration apparatus, in combination, a delay line, at least one magnetic core integrating element connected to the delay line at a point other than the output end of the delay line, said delay line being adapted to have a control signal and a signal to be integrated sequentially applied thereto in the order named, transistor switching means operatively connected in circuit with said integrating element and adapted while a switching signal is applied thereto to close the circuit through said integrating element and provide for the integration of energy applied thereto, control means operatively connected to the output end of the delay line and to said transistor switching means for generating said switching signal and applying said switching signal to the transistor switching means, read-out signal generating means operatively connected to said control means and to said integrating element and constructed and arranged at a preselected time under the control of the control means to generate a read-out signal and apply the read-out signal to the integrating element to thereby return the integrated energy in the integrating element to the delay line, and gate means operatively connected to the read-out signal generator means and to the delay line for providing the passage of the read-out energy from the output end of the delay line.

6. In pulse integration apparatus, in combination, a delay line, said delay line being adapted to have a repetitive control signal and a repetitive signal to be integrated sequentially applied thereto in the order named, each control signal being followed by a signal to be integrated before the next control signal occurs, magnetic core integrating means connecting to the delay line at a point other than the output end of the delay line, switching means operatively connected in circuit in series with the integrating means and adapted while the switching means is closed to complete the circuit through the integrating means and provide for the integration of a portion of the signal to be integrated appearing at said point, control means operatively connected to the output end of the delay line and to said switching means, said control means being responsive to the arrival of a control signal at the output end of the delay line for causing the switching means to close the circuit, pulse counter means operatively connected to said control means, read-out signal generating means operatively connected to the pulse counter means and to the integrating means and constructed and arranged to generate a read-out signal after a preselected number of control pulses have occurred and to apply the read-out signal to the integrating means to thereby provide for the return to the delay line of the energy stored in the integrating means, and gate means operatively connected to the output end of the delay line and to the read-out signal generating means and adapted to have a gate applied thereto under the control of the read-out signal for providing for the passage of stored energy from the output end of the delay line.

References Cited in the file of this patent
UNITED STATES PATENTS

| | | |
|---|---|---|
| 2,794,965 | Yost | June 4, 1957 |
| 2,808,578 | Goodell | Oct. 1, 1957 |
| 2,814,793 | Bonn | Nov. 26, 1957 |
| 2,836,359 | Mazzagatti | May 27, 1958 |
| 2,841,704 | Simstein et al. | July 1, 1958 |
| 2,908,873 | Bogert | Oct. 13, 1959 |